Patented July 6, 1943

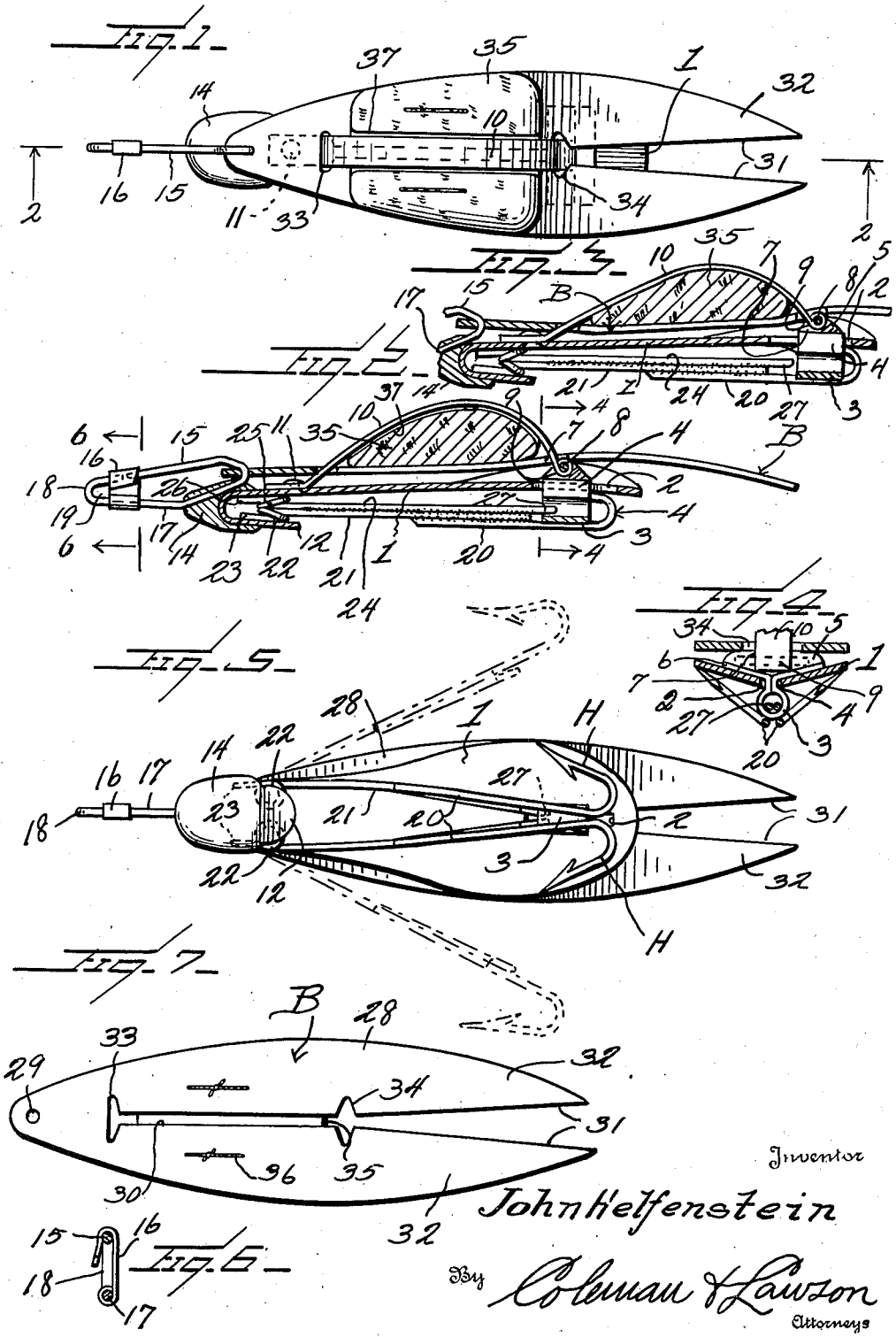

2,323,656

UNITED STATES PATENT OFFICE 2,323,656

FISHHOOK

John Helfenstein, Bismarck, N. Dak.

Application July 28, 1942, Serial No. 452,645

4 Claims. (Cl. 43—36)

This invention relates to a fish hook and more particularly to a device of this kind of a spoon type carrying a pork rind bait, and it is a particular object of the invention to provide a hook of this kind provided with a group of hooks held in such a way that when the fish strikes the hooks will be released in a manner to insure effective engagement of the hooks of the group within the mouth of the fish.

Another object of the invention is to provide a device of this kind including an elongated member carrying a group of hooks and wherein means are provided for releasably holding the hooks of the group retracted, said means including a part disposed over the bait in a position to be hit by a fish when striking to release the hooks for effective engagement within the mouth of the fish.

The invention consists in the details of construction and in the combination and arrangement of the several parts of my improved fish hook whereby certain important advantages are attained, as will be hereinafter more fully set forth.

In order that my invention may be better understood, I will now proceed to describe the same with reference to the accompanying drawing, wherein:

Figure 1 is a view in bottom plan of a hook device constructed in accordance with an embodiment of my invention.

Figure 2 is a sectional view taken substantially on the line 2—2 of Figure 1 with the holding sleeve in effective position.

Figure 3 is a fragmentary sectional view also taken substantially on the line 2—2 of Figure 1 but showing the holding sleeve in released position.

Figure 4 is a transverse sectional view taken substantially on the line 4—4 of Figure 2.

Figure 5 is a view in top plan of the device as herein embodied, a second position of the group of hooks being indicated by broken lines.

Figure 6 is a sectional view taken substantially on the line 6—6 of Figure 2, and Figure 7 is a view in top plan of the bait as herein comprised, unapplied.

As disclosed in the accompanying drawing, 1 denotes an elongated spoon-like member of metal or other desired material and which is provided at its rear portion and at the transverse center thereof with a longitudinally disposed slot 2. Movable lengthwise of the member 1 is a sleeve 3 having its bore disposed in a direction lengthwise of the member 1 and this sleeve 3 is formed to provide a shank portion 4 extending through the slot 2. The shank portion 4 is suitably anchored to a cross-head 5 at the side of the member 1 remote from the sleeve 3.

In the present embodiment of my invention, the sleeve 3 and shank portion 4 are formed of a single strip of metal properly bent upon itself and wherein the shank portion 4 is provided with the oppositely directed arms 6 to which the cross-head 5 is soldered, welded or otherwise rigidly secured. These arms 6, therefore, constitute a part of the cross-head 5.

The cross-head 5 at its central portion is provided with a recess 7 which is intersected by a cross-pin 8. This pin 8 is freely disposed through a sleeve or knuckle 9 carried by an end portion of an outwardly bowed leaf spring 10. This spring 10 extends lengthwise of the member 1 and has its end portion remote from the sleeve or knuckle 9 anchored, as at 11, to the forward end portion of the member 1.

The tension of the spring 10 serves to constantly urge the sleeve 3 forwardly of the member 1 and maintain the same in its effective holding position, as illustrated in Figure 2 of the drawing. It may be stated at this time that the slot 2 in the rear portion of the member 1 is of a length to allow the sleeve 3 to have desired back and forth movement without interference by the shank portion 4.

The forward reduced end portion of the member 1 is returned to provide a plate 12 overlying the member 1 at the same side on which the sleeve 3 is positioned. This plate 12 and the adjacent end portion of the member 1 proper have rigidly secured thereto a head member 14 of desired configuration and dimensions and carried by this head 14 is a resilient pin bar 15. This pin bar 15 is substantially at the transverse center of the member 1 and is of a length to extend in advance of the head 14 for proper coaction with the guard plate 16 carried by an elongated member 17 projecting forwardly and outwardly from the head 14.

The pin bar 15 and member 17 are formed from a single strand of requisite gauge and, as is particularly illustrated in Figure 2 of the drawing, the inner portion of the member 17 is disposed directly through the head 14 to assure an effective connection therewith. The outer extremity of the member 17 is provided with a returned portion 18 coacting with the guard plate 16 to provide an eye 19 for the attachment of a fishing line.

At the same side of the member 1 as the sleeve 3 are the outwardly facing fish hooks H, the shank 20 of each of which extends along and is soldered or otherwise rigidly secured to the rear portion of an elongated rod 21. The forward end portion of the rod 21 is formed to provide a spring coil 22 terminating in an extended arm 23 soldered or otherwise rigidly secured to the inner face of the plate 12.

Extending along and soldered or otherwise rigidly secured to the rod 21 is a second rod 24, the forward end portion of which is formed to provide a spring coil 25 terminating in an extending arm 26 soldered or otherwise rigidly secured to the adjacent face of the member 1. The rod 24 is of a length to extend beyond the rear end of the rod 21, whereby is provided a spur 27 to engage within the sleeve 3, when in its normal forward movement, to hold the hook H retracted.

As is particularly illustrated in Figure 5 of the drawing, the hook members H and the parts directly associated therewith are positioned at opposite sides of the transverse center of the member 1 and when the hooks H are fully retracted it is to be noted that the hooks H are held closely adjacent to the rear portion of the member 1 and within the field defined by said portion of the member 1, whereby the efficiency of the device is materially increased and particularly when trolling.

When the fish strikes for the bait the fish will impose pressure on the spring 10 to effect a sufficient rearward movement of the sleeve 3 to release the spurs 27, whereupon the hooks H will at once separate or spread in a manner to effectively engage within the mouth of the fish, so that any attempt to draw the hooks from within the mouth of the fish will merely result in forcing the points of the hooks into the flesh of the fish.

The bait B used with the device as herein disclosed is preferably of a pork rind type although the bait need not necessarily be made of pork rind as leather or other material may be readily used.

The bait B as herein disclosed comprises an elongated strip 28 of desired configuration and which is provided, as illustrated in Figure 7, at its forward end with an opening 29 through which the pin bar 14 may be readily threaded. This strip 28 at the transverse center thereof and for substantially its entire length is provided with a slot 30 open at the rear end of the strip and with the edges 31 of the rear portion of the strip diverging rearwardly to provide elongated tail-pieces 32. As illustrated in the accompanying drawing, it is to be noted that the bait B or more particularly the strip 28 thereof is of such a length that when the strip is applied the tail-pieces 32 will extend a material distance beyond the rear end of the member 1.

The inner end of the slot 30 communicates with a cross slot 33 of a width to allow the ready passage therethrough of the forward or anchored end portion of the spring 10 while the strip 28 adjacent to the converging ends of the edges 31 of the slot is provided with the transversely disposed notches 34 to allow the applied bait B to straddle the rear portion of the spring 10 and without interfering with the desired back and forth movement of the sleeve 3.

The slot 30 readily permits sufficient separation of the major portion of the strip 28 of the bait B to facilitate the desired application of the strip 28 to the fishing device and, after the strip 29 has been applied, the holding member 35 of cork or kindred material secured, as at 36, to the strip 28 at a desired point between the cross slot 33 and the notches 34, wherein said portion of the strip 28 is held against separation and the bait effectively maintained applied. This member 35 is interposed between the strip 28 and the overlying outbow portion of the spring 10, and the outer face of this member 35 at substantially its transverse center is provided therealong from end to end with a groove 37 to facilitate the desired compression of the spring 10 by the fish.

From the foregoing description it is thought to be obvious that a fish hook constructed in accordance with my invention is particularly well adapted for use by reason of the convenience and facility with which it may be assembled and operated.

What I claim is:

1. A fishing device comprising an elongated member, a sleeve carried by said member for back and forth movement therealong, a bowed leaf spring having one end portion secured to the member and the opposite end portion secured to the sleeve, said spring normally urging the sleeve forwardly, a group of hook members carried by the first-named member, and spurs carried by the hook members engaging within the sleeve when the sleeve is in its forward position to hold the hook members retracted, said hook members automatically separating when the sleeve is moved rearwardly to release the spurs.

2. A fishing device comprising an elongated member, a sleeve carried by said member for back and forth movement therealong, a bowed leaf spring having one end portion secured to the member and the opposite end portion secured to the sleeve, said spring normally urging the sleeve forwardly, a group of hook members carried by the first-named member, and spurs carried by the hook members engaging within the sleeve when the sleeve is in its forward position to hold the hook members retracted, said hook members automatically separating when the sleeve is moved rearwardly to release the spurs, the hook members being at one side of the first-named member and the spring being at the opposite side, the first-named member having a slot through which a part of the sleeve is directed.

3. A fishing device comprising an elongated member, a sleeve carried by said member for back and forth movement therealong, a bowed leaf spring having one end portion secured to the member and the opposite end portion secured to the sleeve, said spring normally urging the sleeve forwardly, a group of hook members carried by the first-named member, spurs carried by the hook members engaging within the sleeve when the sleeve is in its forward position to hold the hook members retracted, said hook members automatically separating when the sleeve is moved rearwardly to release the spurs, and a bait element disposed over the first-named member, said bait element including a buoyant member interposed between the first-named member and the spring.

4. A fishing device comprising an elongated member, a sleeve carried by said member for back and forth movement therealong, a bowed leaf spring having one end portion secured to the member and the opposite end portion secured to the sleeve, said spring normally urging the sleeve forwardly, a group of hook members carried by the first-named member, spurs carried by the hook members engaging within the sleeve when the sleeve is in its forward position to hold the hook members retracted, said hook members automatically separating when the sleeve is moved rearwardly to release the spurs, a bait element disposed over the first-named member, said bait element including a buoyant member interposed between the first-named member and the spring, and means carried by the forward end portion of the first-named member for holding the bait element, the buoyant member providing further means in coaction with the spring for holding the bait element applied.

JOHN HELFENSTEIN.